(12) United States Patent
Liu et al.

(10) Patent No.: US 8,675,298 B2
(45) Date of Patent: Mar. 18, 2014

(54) SYSTEMS AND METHODS FOR ADAPTIVE TARGET SEARCH

(75) Inventors: Jingfeng Liu, Longmont, CO (US);
Hongwei Song, Longmont, CO (US)

(73) Assignee: LSI Corporation, San Jose, CA (US)

( * ) Notice: Subject to any disclaimer, the term of this patent is extended or adjusted under 35 U.S.C. 154(b) by 792 days.

(21) Appl. No.: 12/992,933

(22) PCT Filed: Jan. 9, 2009

(86) PCT No.: PCT/US2009/030639
§ 371 (c)(1),
(2), (4) Date: Nov. 16, 2010

(87) PCT Pub. No.: WO2010/080155
PCT Pub. Date: Jul. 15, 2010

(65) Prior Publication Data
US 2011/0093517 A1    Apr. 21, 2011

(51) Int. Cl.
*G11B 5/035* (2006.01)
*G11B 20/10* (2006.01)

(52) U.S. Cl.
CPC ............................... *G11B 20/10009* (2013.01)
USPC ........................................................... 360/65

(58) Field of Classification Search
CPC .... G11B 20/1009; G11B 5/035; G11B 27/36; G11B 15/34; G11B 5/09
USPC ............. 360/65, 46, 53, 39; 369/59.21, 59.22
See application file for complete search history.

(56) References Cited

U.S. PATENT DOCUMENTS

| | | | |
|---|---|---|---|
| 6,055,119 A | 4/2000 | Lee | |
| 6,685,239 B2 | 5/2002 | Okomoto et al. | |
| 7,212,568 B2 * | 5/2007 | Gryska | .......................... 375/232 |
| 7,256,954 B2 | 8/2007 | Serizawa | |
| 7,495,854 B2 | 2/2009 | Hutchins et al. | |
| 7,859,780 B2 | 12/2010 | Mathew | |

(Continued)

FOREIGN PATENT DOCUMENTS

| | | |
|---|---|---|
| DE | 10127447 | 10/2002 |
| GB | 2 320 866 | 6/1997 |
| GB | 2320866 | 7/1998 |
| JP | 2008-287839 | 11/2008 |

OTHER PUBLICATIONS

Barry J. et al "Iterative Timing Recovery" IEEE Signal Processing Magazine vol. 21, No. 1, Jan. 1, 2004.

(Continued)

*Primary Examiner* — Nabil Hindi
(74) *Attorney, Agent, or Firm* — Hamilton DeSanctis & Cha

(57) ABSTRACT

Various embodiments of the present invention provide systems and methods for data processing. For example, some embodiments of the present invention provide data processing circuits that include both a main data processing circuit and an adaptive setting determination circuit. The main data processing circuit receives a series of data samples and includes: an equalizer circuit and a data detector circuit. The equalizer circuit receives the series of data samples and provides an equalized output. The equalizer circuit is controlled at least in part by a coefficient. The data detector circuit receives the equalizer output and provides a main data output based at least in part on a target. The adaptive setting determination circuit receives the series of data samples and the main data output, and operates in parallel with the main data processing circuit to adaptively determine the coefficient and the target.

20 Claims, 5 Drawing Sheets

(56) References Cited

U.S. PATENT DOCUMENTS

| | | | |
|---|---|---|---|
| 7,872,821 | B2 | 1/2011 | Grundvig |
| 7,872,823 | B2 | 1/2011 | Liu |
| 7,924,523 | B2 | 4/2011 | Mathew |
| 7,929,240 | B2 | 4/2011 | Mathew |
| 7,948,699 | B2 | 5/2011 | Liu |
| 7,948,702 | B2 | 5/2011 | Mueller |
| 7,957,251 | B2 | 6/2011 | Ratnakar Aravind |
| 7,965,467 | B2 | 6/2011 | Mueller |
| 7,969,337 | B2 | 6/2011 | Ratnakar Aravind |
| 7,974,030 | B2 | 7/2011 | Mathew |
| 8,139,305 | B2 | 3/2012 | Mathew |
| 8,154,815 | B2 | 4/2012 | Mueller |
| 2004/0257954 | A1 | 12/2004 | Ohkubo et al. |
| 2005/0094304 | A1 | 5/2005 | Ohkubo et al. |
| 2005/0213241 | A1 | 9/2005 | Cideciyan et al. |
| 2006/0176947 | A1 | 8/2006 | Lim |
| 2008/0031114 | A1 | 2/2008 | Hong et al. |
| 2010/0088357 | A1 | 4/2010 | Mathew |
| 2010/0287420 | A1 | 11/2010 | Mathew |
| 2011/0164669 | A1 | 7/2011 | Mathew |
| 2012/0089657 | A1 | 4/2012 | Yang |

OTHER PUBLICATIONS

Cho and Lee, fiAn Estimation Technique for Nonlinear Distortion in High Density Magnetic Recording Channelsfl, IEEE Transactions on Magnetics, vol. 34, No. 1, pp. 40-44 Jan. 19.

Degroat et al., fiExperimental Characterization of Media Noise Based on Equalized Synchronized Drive Datafl, IEEE Trans. Magnetics, vol. 37, No. 2, pp. 633-638, Mar. 2001.

Farhang-Boroujeny, Adaptive Filters: Theory and Applications. John Wiley & Sons Ltd, 1998, Chapter 11. pp. 373-379.

Kavcic and Patapoutian, fiA Signal-Dependent Autoregressive Channel Modelfl, IEEE Trans. Magnetics, vol. 35 No. 5, pp. 2316-2318, Sep. 1999.

Lin et al. "An estimation technique for accurately modelling the magnetic recording channel including nonlinearities." IEEE Trans. Mag, vol. 25, No. 5, pp. 4084-4086, Sep. 89.

Moon, J., fiSignal-to-Noise Ratio Definition for Magnetic Recording Channels With Transition Noisefl, IEEE Trans. Magnetics, vol. 36, No. 5, pp. 3881-3883, Sep. 2000.

Palmer et al, "Identification of nonlinear write effects using pseudo-random sequences" IEEE Trans. Magnetics, vol. 23 No. 5, pp. 2377-2379, Sep. 1987.

Partovi; et al., "Flow-Through Latch and Edge-Triggered Flip-Flop Hybrid Elements"; Feb. 8, 1996; pp. 138-139; Solid-State Circuits Conf Digest of Technical Papers IEEE.

Tokumasu et al. fiA New Reduced Clock-Swing Flip-Flop (NDKFF),f1Corporate Research & Development Center, Toshiba Corporation. IEEE Feb. 2002 Custom Intergrated Circuits Conf.

Wood and Donaldson, fiThe Helical-Scan Magnetic Tape Recorder as a Digital Communication Channelfl, IEEE Transactions on Magnetics, vol. MAG-15, No. 2, pp. 935-943 Mar. 1979.

PCT International Search Report and Written Opinion PCT/US2009/030639 Jul. 15, 2010.

* cited by examiner

SYSTEMS AND METHODS FOR ADAPTIVE TARGET SEARCH

BACKGROUND OF THE INVENTION

The present inventions are related to systems and methods for accessing data from a storage medium, and more particularly to systems and methods for determining target coefficients for retrieving data from a storage medium.

A typical storage device includes a magnetic storage medium that includes information that is magnetically represented on the storage medium. A head is disposed in relation to the storage medium that senses the magnetically represented information and provides an electrical signal representing the information. This electrical signal is ultimately passed to a data detection circuit that performs one or more data detection processes in order to recover the information originally written to the storage medium. There is generally some variability in the head/medium combinations that are used. Thus, in the manufacturing process, each storage device is tested with a variety of channel settings to determine which settings work best for the particular head/medium combination.

An example of calibrating channel settings is shown in FIG. 1. Turning to FIG. 1, a flow diagram 100 depicts a prior art approach for selecting channel settings during a manufacturing process. Following flow diagram 100, a search mode is selected (block 105). The search mode utilizes a list of previously identified likely target settings. An initial set of target settings from the list of likely target settings are selected (block 110). Selecting the target settings includes identifying a previously untested set of target settings from the list, and applying the target settings to the read circuitry of the storage device. At this point, data is passed to the read circuitry and a data decode/detection is performed on the received data stream (block 115). An error rate for the process is determined (block 120), and the determined error rate is stored in relation to the selected target settings (block 125).

It is then determined if there is another set of target settings on the list of channel settings that remains to be tested (block 130). Where another set of target settings remains to be tested (block 130), the next set of target settings from the list of likely target settings is selected (block 135), and the processes of blocks 115-130 are repeated for this set of target settings. Alternatively, where all of the target settings from the list of target settings have been tested (block 130), the set of target settings that provided the best error rate (i.e., minimum errors) is selected (block 140). This optimal set of target settings is applied to the read circuitry (block 145) and a normal mode of operation is selected (block 150).

It is common for the search approach of flow diagram 100 to involve hundreds of target settings, and to be used to test multiple heads and/or disk zones. For each of the target settings, calibration for CTF cutoff/boost, FIR filters and/or media noise parameters may be performed. As testing one set of target settings can require several minutes, the process of flow diagram 100 involving the testing of hundreds or even thousands of target settings can require a substantial amount of time. Such use of time is costly to a company manufacturing storage devices.

Hence, for at least the aforementioned reasons, there exists a need in the art for advanced systems and methods for selecting channel settings.

BRIEF SUMMARY OF THE INVENTION

The present inventions are related to systems and methods for accessing data from a storage medium, and more particularly to systems and methods for determining target coefficients for retrieving data from a storage medium.

Various embodiments of the present invention provide data processing circuits that include both a main data processing circuit and an adaptive setting determination circuit. The main data processing circuit receives a series of data samples and includes: an equalizer circuit and a data detector circuit. The equalizer circuit receives the series of data samples and provides an equalized output. The equalizer circuit is controlled at least in part by a coefficient. In some cases, a number of coefficients control the equalizer circuit operation. In one particular embodiment, ten coefficients are used. The data detector circuit receives the equalizer output and provides a main data output based at least in part on a target. The adaptive setting determination circuit receives the series of data samples and the main data output, and operates in parallel with the main data processing circuit to adaptively determine the coefficient and the target.

In some instances of the aforementioned embodiments, the adaptive setting determination circuit includes another equalizer circuit that is substantially the same as the equalizer circuit in the main data processing circuit. In addition, the adaptive setting determination circuit includes: a first multiplier circuit multiplying the series of data samples by an error value and providing a coefficient value, a second multiplier circuit multiplying the main data output by the error value and providing a target value, and a convolution circuit. The other equalizer circuit receives the series of data samples and equalizes the series of data samples to provide an equalized output. Operation of the other equalizer circuit is at least in part governed by a coefficient derived from the coefficient value. The convolution circuit provides a convolved output based at least in part on a target derived from the target value.

In other instances of the aforementioned embodiments, the main data processing circuit further includes an error calculation circuit that compares a derivative of the main data output with a derivative of the equalized output to determine an error value. The adaptive setting determination circuit includes a first multiplier circuit multiplying the series of data samples by the error value to create a coefficient value, and a second multiplier circuit multiplying the main data output by the error value to create a target value. An equalizer gradient accumulator circuit receives the coefficient value and provides the coefficient, and a target gradient accumulator circuit receives the target value and provides the target. A coefficient load circuit receives the coefficient from the equalizer gradient accumulator circuit and provides it to the equalizer circuit at a defined time; and a target load circuit receives the target from the target gradient accumulator circuit and provides it to the data detector circuit at the defined time.

Other embodiments of the present invention provide a channel setting determination circuit. The channel setting determination circuit includes a main data processing circuit processing a series of data samples to provide a main data output. A first multiplier circuit multiplies the series of data samples by an error value and provides a coefficient value; and a second multiplier circuit multiplies the main data output by the error value and provides a target value. An equalizer circuit receives the series of data samples and equalizes the series of data samples to provide an equalized output. Operation of the equalizer circuit is at least in part governed by a coefficient derived from the coefficient value. A convolution circuit provides a convolved output based at least in part on a target derived from the target value.

In some instances of the aforementioned embodiments, the circuit further includes an adder circuit providing a difference between the equalized output and the convolved output. In various instance, the main data processing circuit includes another equalizer circuit that receives the series of data samples, and a data detector circuit that receives an output of the second equalizer circuit and provides the main data output. In some such cases, the equalizers are substantially equivalent. In some cases, the equalizers are both finite impulse response filter having at least a one tap. In operation, the coefficient is provided to the at least one tap of the equalizer in the main data processing circuit when the error value is a minimum, and to the other equalizer at all times. In some cases, the target is provided to the data detector circuit when the error value is a minimum.

Yet other embodiments of the present invention provide channel setting determination circuits. Such circuits include a main data processing circuit and an adaptive setting determination circuit. The main data processing circuit includes: an equalizer circuit receiving a series of data samples and providing an equalized output; a data detector circuit receiving the equalizer output and providing a main data output based at least in part on a target; and an error calculation circuit that compares a derivative of the main data output with a derivative of the equalized output to determine an error value. Operation of the equalizer circuit is controlled at least in part by a coefficient. The adaptive setting determination circuit includes: a first multiplier circuit multiplying the series of data samples by the error value to create a coefficient value, and a second multiplier circuit multiplying the main data output by the error value to create a target value. An equalizer gradient accumulator circuit receives the coefficient value and provides the coefficient, and a target gradient accumulator circuit receives the target value and provides the target.

In some instances of the aforementioned embodiments, the error calculation circuit includes a convolution circuit and an adder circuit. The convolution circuit receives the main data output and provides a convolved output based at least in part on the target. The adder circuit subtracts the convolved output from a derivative of the equalized output to generate the error value. In various instances of the aforementioned embodiments, the convolution circuit is a three tap finite impulse response filter, and the target is applied to the three taps. In some embodiments of the present invention, the equalizer circuit is a ten tap finite impulse response filter, and wherein the coefficient is applied to the ten taps. In particular instances of the aforementioned embodiments, the data detector circuit includes a low density parity check decoder circuit. In one or more instances of the aforementioned embodiments, the circuit further includes a coefficient load circuit that receives the coefficient from the equalizer gradient accumulator circuit and provides it to the equalizer circuit at a defined time. In various instances, the circuit further includes a target load circuit that receives the target from the target gradient accumulator circuit and provides it to the data detector circuit at a defined time.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to systems and methods for accessing data from a storage medium, and more particularly to systems and methods for determining target coefficients for retrieving data from a storage medium.

Some embodiments of the present invention employ an adaptive setting determination circuit that operates in parallel to the main data processing circuit. The adaptive setting determination circuit receives the same data provided to the main data processing circuit and on each pass applies a different set of channel settings. The next set of channel settings is adaptively selected based using a Least Mean Square (LMS) error criteria applied to the results achieved by the prior set of channel settings. This adaptive approach allows for identifying an appropriate set of channel settings without requiring a search of a large number of possible candidates.

Figure 1:
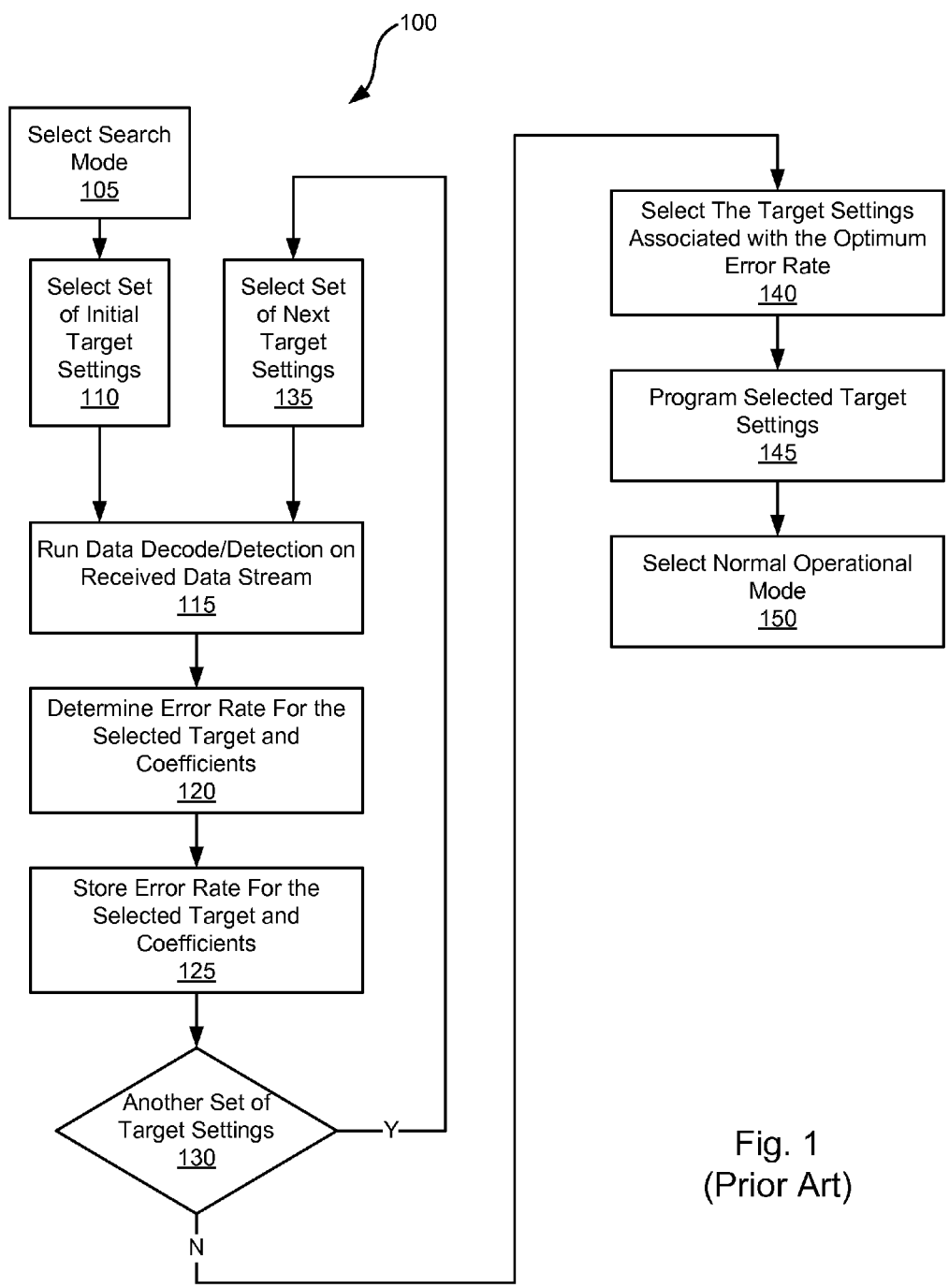
FIG. 1 is a flow diagram depicting a prior art approach for selecting channel settings during a manufacturing process.
Figure 2:
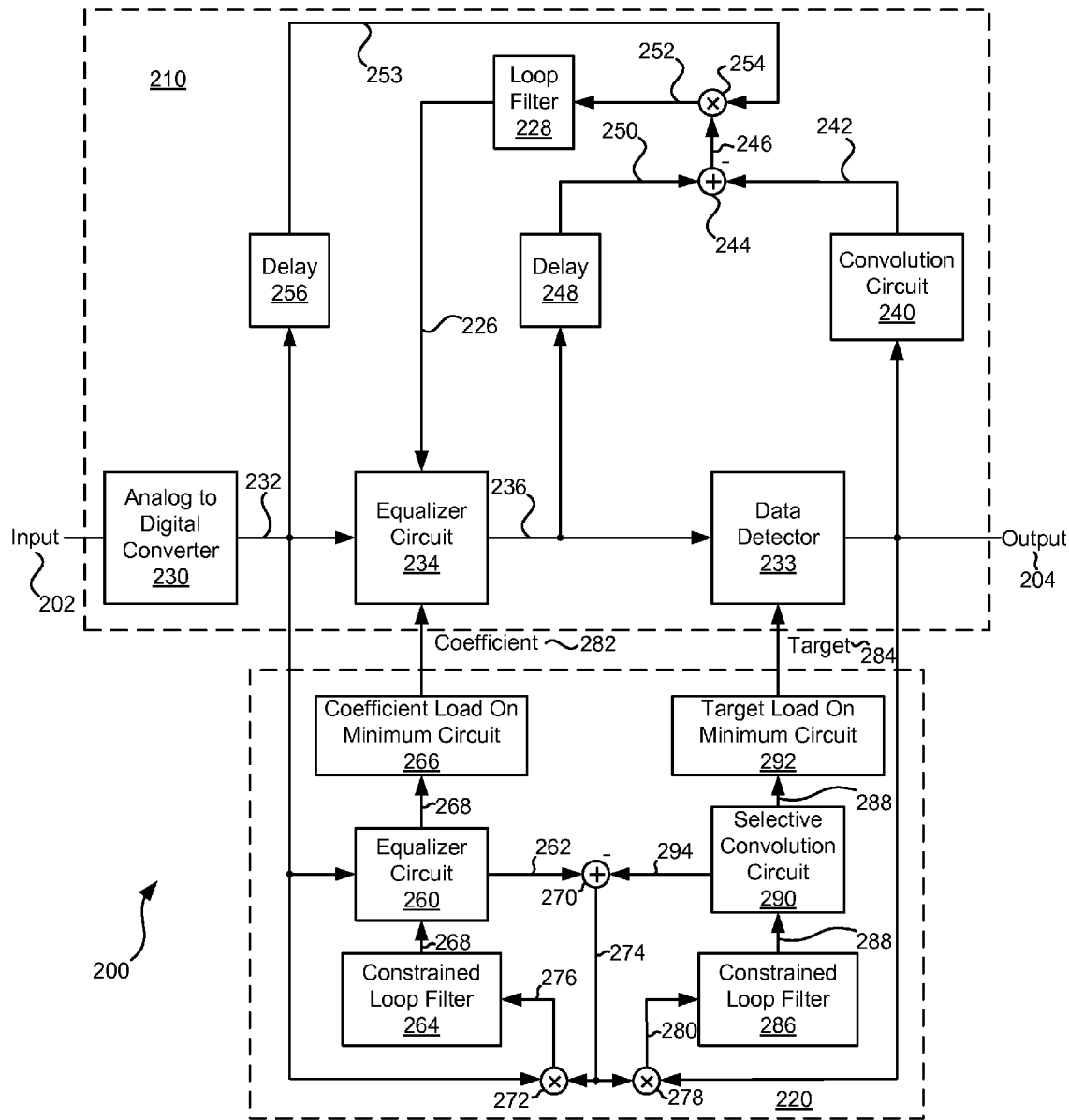
FIG. 2 depicts a circuit for adaptive channel setting selection in accordance with one or more embodiments of the present invention.

Turning to FIG. 2, an adaptive channel setting selection circuit 200 is shown in accordance with one or more embodiments of the present invention. As shown, adaptive channel setting selection circuit 200 includes a main data processing circuit 210 (outlined by a dashed line), and an adaptive setting determination circuit 220 (outlined by a dashed line). Main data processing circuit 210 includes an analog to digital converter 230 that receives an analog input signal 202. Analog to digital converter 230 may be implemented as any analog to digital conversion circuit or process known in the art. In some cases, the analog input signal 202 represents data accessed from a magnetic storage medium such as, for example, a platter of a hard disk drive. In such cases, analog input signal 202 is received via a read/write head assembly and various analog front end processing circuitry known in the art. Analog to digital converter 230 provides a series of digital samples 232 corresponding to analog input signal 202.

The series of digital samples 232 are provided to an equalizer circuit 234 that provides an equalized output 236. The operation of equalizer circuit 234 is governed at least in part by a coefficient 282. Initially, coefficient 282 may be set to a default value, but may be later modified depending upon the operation of adaptive setting determination circuit 220. In some embodiments of the present invention, equalizer circuit 234 is implemented as a finite impulse response (FIR) filter. In such a case, coefficient 282 may include one or more taps for the FIR filter.

Equalized output 236 is provided to a data detector circuit 238. The operation of data detector circuit 238 is at least in part governed by a partial response target 284. Data detector circuit 238 may be any circuit known in the art that is capable of performing a data detection process. As one example, data detector circuit 238 may include a low density parity check decoder as are known in the art. Based upon the disclosure provided herein, one of ordinary skill in the art will recognize other data detector circuits that may be used in relation to different embodiments of the present invention. Data detector circuit 238 provides an output 204. Output 204 is provided to a convolution circuit 240 that effectively operates to provide the equivalent of equalized output 236 modified to take advantage of the process of data detector circuit 238. Convolution circuit 240 provides a convolved output 242 to an adder circuit 244. In some embodiments of the present invention, convolution circuit 240 is a three tap finite impulse response filter where the taps are driven by the primary target used by data detector circuit 238. Equalized output 236 is provided to a delay circuit 248 that provides a delayed equalized output 250 that is equalized output 236 delayed in time to match the delay through data detector circuit 238 and convolution circuit 240. As such, delayed equalized output 250 is aligned with convolved output 242. Adder circuit 244 compares convolved output 242 with delayed equalized output 250, and provides the difference as an error 246. As target 284 and coefficient 282 are fixed until updated by adaptive setting determination circuit 220, error 246 remains substantially constant. Once target 284 and coefficient 282 are modified by adaptive setting determination circuit 220, error 246 is reduced.

Digital samples 232 are provided to a delay circuit 256 that provides delayed digital samples 258. Delayed digital samples 258 are digital samples 232 delayed in time sufficient to match the time required to process the samples via equalizer circuit 234, data detector circuit 238, convolution circuit 240 and added circuit 254. Delayed digital samples 258 are multiplied by error 246 using a multiplier circuit 254, and a result 252 is provided to a loop filter 228. Loop filter 228 provides a Least Mean Squared (LMS) error signal 226 to equalizer circuit 234 that is used to adjust the gain of equalizer circuit 234.

In parallel to main data processing circuit 210, digital samples 232 are provided to adaptive setting determination circuit 220. Digital samples 232 are directed to an equalizer circuit 260 that is substantially equivalent to equalizer circuit 234. The operation of equalizer circuit 260 is governed at least in part by a coefficient 268 provided from a constrained loop filter circuit 264. Initially, coefficient 268 may be set to the same value as coefficient 282, but is adaptively modified using the feedback loops of adaptive setting determination circuit 220. In some embodiments of the present invention, equalizer circuit 260 is implemented as a finite impulse response (FIR) filter. In such a case, coefficient 268 may include one or more taps for the FIR filter. Equalizer circuit 260 provides an equalized output 262 corresponding to digital samples 232 to an adder circuit 270.

In one particular embodiment of the present invention, the following constraints are imposed by constrained loop filter 260 where equalizer circuits 234, 260 are each ten tap filters. First, tap four of the ten tap filter is constrained to be one. Second, the delta between tap five and tap three of the ten tap filter is constrained to be constant across different channel settings. In some cases, the first constraint is a requirement, while the second constraint is optional. It should be noted that the preceding constraints are merely exemplary, and that many constraints may be applied via constrained loop filter 264 depending upon the particular design. Based upon the disclosure provided herein, one of ordinary skill in the art will recognize a variety of constraints that may be applied.

Digital samples 232 are additionally provided to a multiplier circuit 272 that multiplies an error 274 by digital samples 232 to provide an output 276. The loop from digital samples 232 to constrained loop filter 264 is similar to the loop from digital samples 232 to loop filter 228. Constrained loop filter 264 operates similar to loop filter 228 in determining an appropriate feedback to equalizer circuit 260. Unlike loop filter 228, however, constrained loop filter 264 will only allow certain feedback results. For example, a value of zero may satisfy the requirements of the adaptive loops, but at the same time may be a meaningless result. Hence, where output 276 suggests providing a value of zero as coefficient 268, constrained loop filter disallows the condition and provides a non-zero value as coefficient 268. Based upon the disclosure provided herein, one of ordinary skill in the art will recognize a variety of conditions that would for some reason be unacceptable. The possibility of these conditions may be eliminated by identifying them in a memory accessible to constrained loop filter 264.

Output 204 is provided to a multiplier 278 that multiplies error 274 by output 204 to provide an output 280. Output 280 is provided to a constrained loop filter 286 that limits the selection of partial response targets 286 to previously determined values. Constrained loop filter 286 provides a target 288 to a selective convolution circuit 290. In some embodiments of the present invention, selective convolution circuit 290 is a three tap finite impulse response filter where the taps are programmable. Selective convolution circuit 290 operates similar to convolution circuit 240 in that it attempts to provide the equivalent of equalized output 262 modified to take advantage of the process of data detector circuit 238. However, it is different from convolution target circuit 240 in that the target around which the convolution is performed is changing, whereas the target used by convolution circuit 290 only changes once the appropriate target is determined and provided as target 284. The operation of selective convolution circuit 290 is governed at least in part by target 288. Selective convolution circuit 290 provides a convolved output 294 that corresponds in time to equalized output 262. Adder circuit 270 compares convolved output 294 with equalized output 262, and provides the difference as error 274. Constrained loop filter 264 and constrained loop filter 286 each operate to select respective outputs that will drive error 274 to zero. In operation, error 274 is applied back through a first constrained Least Mean Squared (LMS) loop consisting of multiplier 278, constrained loop filter 286, selective convolution circuit 290, and adder circuit 270; and back through a second constrained Least Mean Squared (LMS) loop consisting of multiplier 272, constrained loop filter 264, equalizer circuit 260, and adder circuit 270. These loops work together to drive error 274 to zero.

In one particular embodiment of the present invention, the following constraints are imposed by constrained loop filter 286 where a three tap target is used. First, a fixed DC value is maintained by assuring that the sum of all three tap values is a constant or fixed value. Second, the delta between tap one and tap three is maintained within a fixed range. This is useful where one phase may be preferred over other phases. In some cases, the first constraint is a requirement, while the second constraint is optional. It should be noted that the preceding constraints are merely exemplary, and that many constraints may be applied via constrained loop filter 286 depending upon the particular design. Based upon the disclosure provided herein, one of ordinary skill in the art will recognize a variety of constraints that may be applied.

Coefficient 268 is provided to a coefficient load circuit 266 and target 288 is provided to a target load circuit 292. Once a minimum of error 274 is achieved, the current coefficient 268 is provided as coefficient 282 by coefficient load circuit 266 and the current target 288 is provided as partial response target 284 by target load circuit 292. In this way, the operation of main data processing circuit 210 remains largely unchanged, while at the same time, an adaptive selection of channel settings is performed that converges on an optimum set of channel settings more quickly than a traditional search approach. It should be noted that once the minimum (i.e., error 274 is a minimum) has been found, the identified target and coefficient values can be saved to a register and adaptive setting determination circuit 220 can be powered down or placed in a sleep mode.

Figure 3:
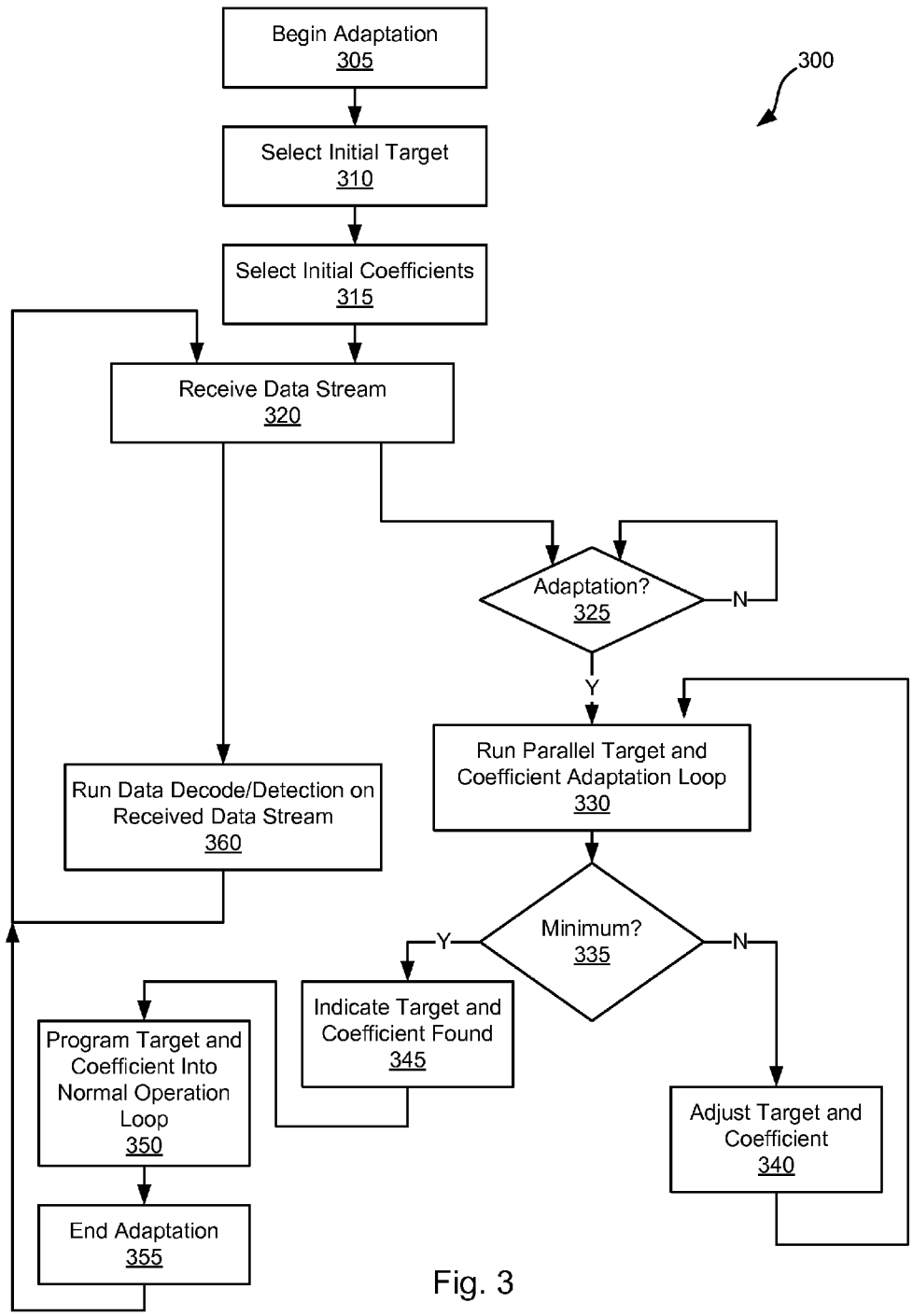
FIG. 3 is a flow diagram depicting a method for adaptive channel setting selection in accordance with various embodiments of the present invention.

Turning to FIG. 3, a flow diagram 300 depicts a method for adaptive channel setting selection in accordance with various embodiments of the present invention. Following flow diagram 300, the adaptation process is selected to begin (block 305). This may include, for example, selecting an adaptation mode by writing a particular code to a data receiving circuit. During this adaptation mode, a training process is applied that adaptively determines an optimum set of channel settings for the data receiving circuit. As part of this process, an initial target is selected (block 310) and an initial coefficient is selected (block 315).

A data stream is received (block 320). This data stream may be received from an analog to digital converter. The analog to digital converter may have received an analog input signal representing data sensed from a magnetic storage medium. Alternatively, the data stream may be digital samples that are stored in a memory and are repeatedly presented as a series of digital samples to the data processing circuit. Based upon the disclosure provided herein, one of ordinary skill in the art will recognize a variety of sources for data that may be used to train the coefficient and target of the data processing circuitry. A standard data decode/detection process is applied to the received data stream (block 360). This standard decode/detection process utilizes a main data processing circuit and provides an output that, when properly recovered, represents an originally encoded data source. This data decode/detection process represents the normal mode of operation for the circuit and uses the selected coefficients and target to perform processing.

In addition, it is determined whether an adaptation mode is selected (block 325). When selected, the adaptation mode operates a parallel circuit that adaptively update the coefficients and target to determine an optimum set of channel settings that may then be applied to the main data processing circuit. When the adaptation mode is selected, a parallel target and coefficient adaptation loop is operated using data input to the main data processing circuit and data output from the main data processing circuit (block 330). At the end of each processing segment it is determined if the particular channel settings used to operate the parallel target and coefficient adaptation loop resulted in a minimum error value (block 335). In some cases, the end of each processing segment corresponds to the end of a sector of data from a magnetic storage medium. Based upon the disclosure provided herein, one of ordinary skill in the art will recognize other processing ends that may be used as points where an error minimum may be detected in accordance with different embodiments of the present invention. Where a minimum has not yet been achieved (block 335), a new target and coefficient set are chosen (block 340). This new target and coefficient set are applied to the parallel target and coefficient adaptation loop, the and the adaptation loop is run again using the new target and coefficient set (block 330). The parallel target and coefficient adaptation loop is again run using the data input to data input to the main data processing circuit and data output from the main data processing circuit. At the end of the processing segment, it is again determined whether a minimum has been achieved (block 335). Until a minimum is achieved (block 335), the processes of blocks 330-340 are repeated.

Alternatively, where it is determined that the current target and coefficient set resulted in a minimum (block 335), a ready state indicator is set indicating that an appropriate target and coefficient set has been found (block 345). Upon receiving this indication, the identified target and coefficient set are programmed into the main data processing circuit (block 350). This may include, for example, providing the identified target to a data decode/detection circuit of the main data processing circuit, and providing the coefficient(s) to an equalizer circuit of the main data processing circuit. Once this programming is completed (block 350), the adaptation process is done (block 355). In some cases, the circuitry used to implement parallel target and coefficient adaptation loop is powered down or otherwise put into a sleep or non-operative mode. In other cases, the parallel target and coefficient adaptation loop continues to operate at all times and provides updated targets and/or coefficients when significant changes in the normal operational mode are identified.

Figure 4:
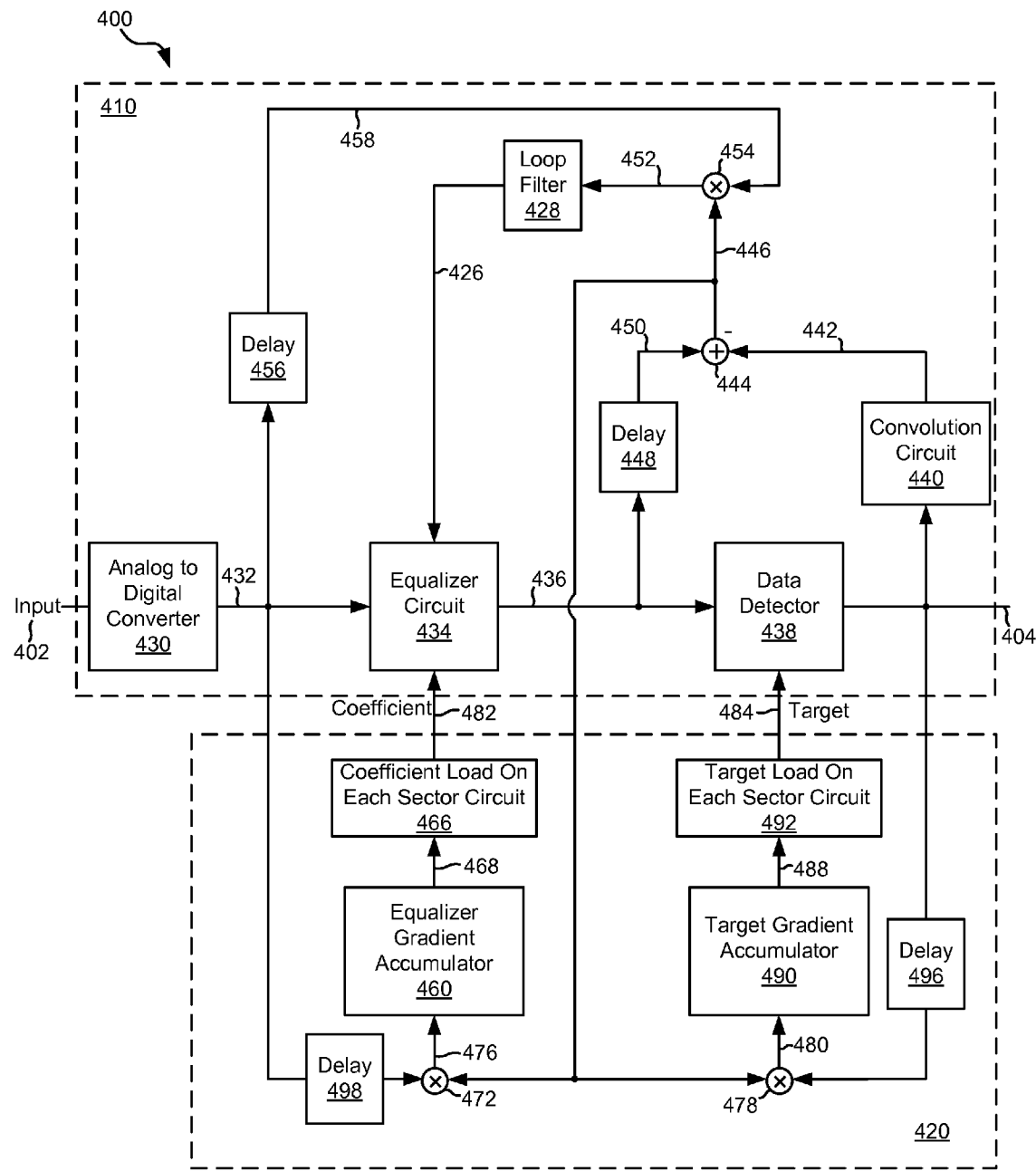
FIG. 4 shows an alternative circuit for adaptive channel setting selection in accordance with some embodiments of the present invention.

Turning to FIG. 4, an alternative adaptive channel setting selection circuit 400 is shown in accordance with some embodiments of the present invention. Adaptive channel setting selection circuit 400 is similar to adaptive channel setting selection circuit 200, except that there is no real time update of the target and coefficients. As shown, adaptive channel setting selection circuit 400 includes a main data processing circuit 410 (outlined by a dashed line), and an adaptive setting determination circuit 420 (outlined by a dashed line). Main data processing circuit 410 includes an analog to digital converter 430 that receives an analog input signal 402. Analog to digital converter 430 may be implemented as any analog to digital conversion circuit or process known in the art. In some cases, the analog input signal 402 represents data accessed from a magnetic storage medium such as, for example, a platter of a hard disk drive. In such cases, analog input signal 402 is received via a read/write head assembly and various analog front end processing circuitry known in the art. Analog to digital converter 430 provides a series of digital samples 432 corresponding to analog input signal 402.

The series of digital samples 432 are provided to an equalizer circuit 434 that provides an equalized output 436. The operation of equalizer circuit 434 is governed at least in part by a coefficient 482. Initially, coefficient 482 may be set to a default value, but may be later modified depending upon the operation of adaptive setting determination circuit 420. In some embodiments of the present invention, equalizer circuit 434 is implemented as a finite impulse response (FIR) filter. In such a case, coefficient 482 may include one or more taps for the FIR filter.

Equalized output 436 is provided to a data detector circuit 438. The operation of data detector circuit 438 is at least in part governed by a partial response target 484. Data detector circuit 438 may be any circuit known in the art that is capable of performing a data detection process. As one example, data detector circuit 438 may include a low density parity check decoder as are known in the art. Based upon the disclosure provided herein, one of ordinary skill in the art will recognize other data detector circuits that may be used in relation to different embodiments of the present invention. Data detector circuit 438 provides an output 404. Output 404 is provided to a convolution circuit 440 that effectively operates to provide the equivalent of equalized output 436 modified to take advantage of the process of data detector circuit 438. Convolution circuit 440 provides a convolved output 442 to an adder circuit 444. Equalized output 436 is provided to a delay circuit 448 that provides a delayed equalized output 450 that is equalized output 436 delayed in time to match the delay through data detector circuit 438 and convolution circuit 440. As such, delayed equalized output 450 is aligned with convolved output 442. Adder circuit 444 compares convolved output 442 with delayed equalized output 450, and provides the difference as an error 446. In contrast to adaptive channel setting selection circuit 200 the target and coefficients are updated as soon as an appropriate set are determined, the target and coefficients are updated at the end of each sector of data in adaptive channel setting selection circuit 200. As such, error 446 is updated for each sector of data processed.

Digital samples 432 are provided to a delay circuit 456 that provides delayed digital samples 458. Delayed digital samples 458 are digital samples 432 delayed in time sufficient to match the time required to process the samples via equalizer circuit 434, data detector circuit 438, convolution circuit 440 and added circuit 454. Delayed digital samples 458 are multiplied by error 446 using a multiplier circuit 454, and a result 452 is provided to a loop filter 428. Loop filter 428 provides a Least Mean Squared (LMS) error signal 426 to equalizer circuit 434 that is used to adjust the gain of equalizer circuit 434.

In parallel to main data processing circuit 410, digital samples 432 are provided to adaptive setting determination circuit 420. Digital samples 432 are directed to a multiplier 472 via a delay circuit 498. Delay circuit 498 delays digital samples 432 in time similar to delay circuit 456 to correspond to error 446. Multiplier 472 multiplies the delayed digital samples 432 by error 446 to provide an output 476. Output 476 is provided to an equalizer gradient accumulator circuit 460. Equalizer gradient accumulator circuit 460 aggregates the product of error 446 and digital samples 432 across an entire sector of data received via analog data input 402, and calculates a coefficient 468 based upon the aggregate. At the end of the sector, a coefficient load circuit 466 provides coefficient 468 to equalizer circuit 434 as coefficient 482.

Output 404 is provided to a multiplier 478 via a delay circuit 496. Delay circuit 496 delays output 404 to correspond to error 446 (i.e., to match the delay through convolution circuit 440 and adder circuit 444). Multiplier 478 multiplies output 404 by error 446 and provides an output 480. Output 480 is provided to a target gradient accumulator circuit 490. Target gradient accumulator circuit 490 aggregates the product of error 446 and output 404 across an entire sector of data received via analog data input 402, and calculates a target 488 based upon the aggregate. At the end of the sector, a target load circuit 492 provides coefficient 488 to data detector circuit 438 as target 484. Similar constraints as discussed above in relation to FIG. 2 may also be applied to any coefficients 468 and targets 488 produced by adaptive setting determination circuit 420.

Figure 5:
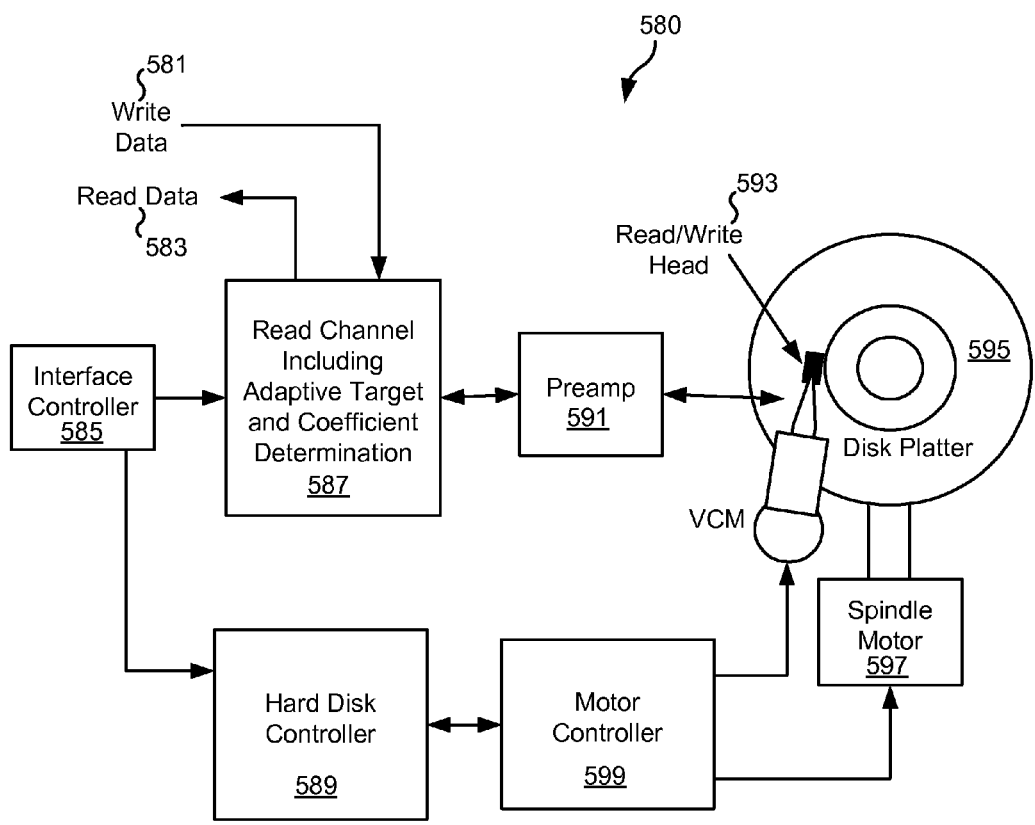
FIG. 5 depicts a storage device including adaptive target and coefficient selection in accordance with various embodiments of the present invention.

Turning to FIG. 5, a storage device 580 including a read channel 587 with adaptive target and coefficient determination circuitry is shown in accordance with some embodiments of the present invention. Storage device 580 may be, for example, a hard disk drive. The incorporated adaptive target and coefficient determination circuitry is capable of adaptively identifying desirable channel settings and of providing those channel settings for use during normal operation. The adaptive target and coefficient determination circuitry may include components similar to those described above in relation to FIG. 2 or FIG. 4, and may operate using a method similar to that described above in relation to FIG. 3.

In addition, storage device 580 includes an interface controller 585, a hard disk controller 589, a motor controller 599, and a spindle motor 597. Interface controller 585 controls addressing and timing of data to/from disk platter 595. The data on disk platter 595 consists of groups of magnetic signals that may be detected by read/write head assembly 593 when the assembly is properly positioned over disk platter 595. The data signals are typically arranged in sectors and tracks as is known in the art. In a typical read operation, read/write head assembly 593 is accurately positioned by motor controller 599 over a desired data track on disk platter 595. Motor controller 599 both positions read/write head assembly 593 in relation to disk platter 595 and drives spindle motor 597 by moving read/write head assembly to the proper data track on disk platter 595 under the direction of hard disk controller 589. Spindle motor 597 spins disk platter 595 at a determined spin rate (RPMs).

Once read/write head assembly 593 is positioned adjacent the proper data track, magnetic signals representing data on disk platter 595 are sensed by read/write head assembly 593 as disk platter 595 is rotated by spindle motor 597. The sensed magnetic signals are provided as a continuous, minute analog signal representative of the magnetic data on disk platter 595. This minute analog signal is transferred from read/write head assembly 593 to read channel module 587. Read channel module 587 performs a data detection process directed at retrieving the original data. This process may be repeated a number of times while the appropriate channel settings are determined by the adaptive target and coefficient determination circuitry. A write operation is substantially the opposite of the preceding read operation with write data 581 being provided to read channel module 587. This data is then encoded and written to disk platter 595.

In conclusion, the invention provides novel systems, devices, methods and arrangements for determining appropriate channel settings. While detailed descriptions of one or more embodiments of the invention have been given above, various alternatives, modifications, and equivalents will be apparent to those skilled in the art without varying from the spirit of the invention. For example, one or more embodiments of the present invention may be applied to various data storage systems and digital communication systems, such as, for example, tape recording systems, optical disk drives, wireless systems, and digital subscribe line systems. Therefore, the above description should not be taken as limiting the scope of the invention, which is defined by the appended claims.

What is claimed is:

1. A data processing circuit, the circuit comprising:
   a main data processing circuit receiving a series of data samples and including:
      an equalizer circuit receiving the series of data samples and providing an equalized output, wherein the equalizer circuit is controlled at least in part by a coefficient; and
      a data detector circuit, wherein the data detector circuit receives the equalizer output and provides a main data output based at least in part on a target; and
   an adaptive setting determination circuit receiving the series of data samples and the main data output, and operating in parallel with the main data processing circuit to adaptively determine the coefficient and the target.

2. The circuit of claim 1, wherein the equalizer circuit is a first equalizer circuit, and wherein the adaptive setting determination circuit includes:

a first multiplier circuit multiplying the series of data samples by an error value and providing a coefficient value;

a second multiplier circuit multiplying the main data output by the error value and providing a target value;

an second equalizer circuit receiving the series of data samples and equalizing the series of data samples to provide an equalized output, wherein operation of the second equalizer circuit is at least in part governed by a coefficient derived from the coefficient value; and a convolution circuit, wherein the convolution circuit provides a convolved output based at least in part on a target derived from the target value.

3. The circuit of claim 2, wherein the first equalizer circuit and the second equalizer circuit are substantially identical.

4. The circuit of claim 1, wherein the main data processing circuit further includes an error calculation circuit, wherein the error calculation circuit compares a derivative of the main data output with a derivative of the equalized output to determine an error value, and wherein the adaptive setting determination circuit includes:

a first multiplier circuit multiplying the series of data samples by the error value to create a coefficient value;

a second multiplier circuit multiplying the main data output by the error value to create a target value;

an equalizer gradient accumulator circuit receiving the coefficient value and providing the coefficient;

a target gradient accumulator circuit receiving the target value and providing the target;

a coefficient load circuit, wherein the coefficient load circuit receives the coefficient from the equalizer gradient accumulator circuit and provides it to the equalizer circuit at a defined time; and a target load circuit, wherein the target load circuit receives the target from the target gradient accumulator circuit and provides it to the data detector circuit at the defined time.

5. A channel setting determination circuit, the circuit comprising:

a main data processing circuit processing a series of data samples to provide a main data output;

a first multiplier circuit multiplying the series of data samples by an error value and providing a coefficient value;

a second multiplier circuit multiplying the main data output by the error value and providing a target value;

an equalizer circuit receiving the series of data samples and equalizing the series of data samples to provide an equalized output, wherein operation of the equalizer circuit is at least in part governed by a coefficient derived from the coefficient value; and a convolution circuit, wherein the convolution circuit provides a convolved output based at least in part on a target derived from the target value.

6. The circuit of claim 5, wherein the circuit further comprises an adder circuit providing a difference between the equalized output and the convolved output.

7. The circuit of claim 6, wherein the equalizer is a first equalizer, and wherein the main data processing circuit includes:

a second equalizer, wherein the second equalizer receives the series of data samples; and a data detector circuit, wherein the data detector circuit receives an output of the second equalizer circuit and provides the main data output.

8. The circuit of claim 7, wherein the first equalizer is substantially equivalent to the second equalizer.

9. The circuit of claim 7, wherein the first equalizer circuit is a first finite impulse response filter having at least a first tap, wherein the second equalizer circuit is a second finite impulse response filter having at least a second tap, wherein the coefficient is provided to the first tap.

10. The circuit of claim 9, wherein the coefficient is provided to the second tap when the error value is a minimum.

11. The circuit of claim 7, where the target is provided to the data detector circuit when the error value is a minimum.

12. The circuit of claim 5, wherein the equalizer circuit is a finite impulse response filter including at least one tap, and wherein the coefficient is provided to the at least one tap.

13. The circuit of claim 5, wherein the convolution circuit is a finite impulse response filter including at least one tap, and wherein the target is provided to the at least one tap.

14. A channel setting determination circuit, the circuit comprising:

a main data processing circuit, wherein the main data processing circuit includes:

an equalizer circuit receiving a series of data samples and providing an equalized output, wherein the equalizer circuit is controlled at least in part by a coefficient;

a data detector circuit, wherein the data detector circuit receives the equalizer output and provides a main data output based at least in part on a target;

an error calculation circuit, wherein the error calculation circuit compares a derivative of the main data output with a derivative of the equalized output to determine an error value; and an adaptive setting determination circuit, wherein the adaptive setting determination circuit includes:

a first multiplier circuit multiplying the series of data samples by the error value to create a coefficient value;

a second multiplier circuit multiplying the main data output by the error value to create a target value;

an equalizer gradient accumulator circuit receiving the coefficient value and providing the coefficient; and a target gradient accumulator circuit receiving the target value and providing the target.

15. The circuit of claim 14, wherein the error calculation circuit includes:

a convolution circuit receiving the main data output and providing a convolved output based at least in part on the target; and an adder circuit subtracting the convolved output from a derivative of the equalized output to generate the error value.

16. The circuit of claim 15, wherein the convolution circuit is a three tap finite impulse response filter, and wherein the target is applied to the three taps.

17. The circuit of claim 14, wherein the equalizer circuit is a ten tap finite impulse response filter, and wherein the coefficient is applied to the ten taps.

18. The circuit of claim 14, wherein the data detector circuit includes a low density parity check decoder circuit.

19. The circuit of claim 14, wherein the circuit further includes a coefficient load circuit, wherein the coefficient load circuit receives the coefficient from the equalizer gradient accumulator circuit and provides it to the equalizer circuit at a defined time.

20. The circuit of claim 14, wherein the circuit further includes a target load circuit, wherein the target load circuit receives the target from the target gradient accumulator circuit and provides it to the data detector circuit at a defined time.

* * * * *